United States Patent
Nungesser et al.

(10) Patent No.: US 6,921,432 B2
(45) Date of Patent: Jul. 26, 2005

(54) STABLE MIXTURES CONTAINING EXTENDER PIGMENTS

(75) Inventors: Edwin Hugh Nungesser, Horsham, PA (US); Jerry William Washel, Harleysville, PA (US); John Michael Friel, Warminster, PA (US)

(73) Assignee: Rohm & Haas Company, Philadelphia, PA (US)

( * ) Notice: Subject to any disclaimer, the term of this patent is extended or adjusted under 35 U.S.C. 154(b) by 6 days.

(21) Appl. No.: 10/214,509

(22) Filed: Aug. 8, 2002

(65) Prior Publication Data

US 2003/0033962 A1 Feb. 20, 2003

Related U.S. Application Data

(60) Provisional application No. 60/312,356, filed on Aug. 15, 2001.

(51) Int. Cl.[7] ............................. C09D 5/00; C09D 7/00; C09C 1/00; C09C 3/00
(52) U.S. Cl. ...................... 106/401; 106/415; 106/461; 106/465; 106/482; 106/483; 106/486; 106/487; 106/499; 106/501
(58) Field of Search ............................... 106/401, 415, 106/461, 465, 482, 483, 486, 487, 499, 501

(56) References Cited

U.S. PATENT DOCUMENTS

| | | | | |
|---|---|---|---|---|
| 5,879,442 A | * | 3/1999 | Nishiguchi et al. | 106/464 |
| 5,989,331 A | | 11/1999 | Bauer et al. | |
| 5,989,332 A | * | 11/1999 | Weitzel et al. | 106/464 |
| 6,063,182 A | * | 5/2000 | Babler | 106/506 |
| 6,360,974 B1 | * | 3/2002 | Sacharski et al. | 241/16 |
| 6,414,065 B1 | * | 7/2002 | Boylan | 524/425 |
| 6,441,076 B1 | * | 8/2002 | Boylan | 524/425 |
| 6,572,694 B2 | * | 6/2003 | Towe | 106/464 |
| 6,734,226 B2 | * | 5/2004 | Hermes | 523/172 |
| 2002/0013401 A1 | * | 1/2002 | Friel et al. | 524/501 |
| 2002/0016405 A1 | * | 2/2002 | Friel et al. | 524/501 |
| 2003/0232913 A1 | * | 12/2003 | Bakule | 524/500 |

FOREIGN PATENT DOCUMENTS

| | | |
|---|---|---|
| EP | 1125643 A2 | 1/2001 |
| WO | WO93/02963 | 2/1993 |
| WO | WO00/37568 | 6/2000 |

OTHER PUBLICATIONS

"Custom Colours", Industrial and Materials Technologies, Jul. 1998 (2 pages).

Any Kind of Paint You Like, Innovation & Technology Transfer, Jul. 2000, p. 1–4.

U.S. Appl. No. 09/766,435 entitled "Distributed Paint Manufacturing System" filed Jan. 19, 2001.

* cited by examiner

*Primary Examiner*—Anthony J. Green

(57) ABSTRACT

A number of stable mixtures are disclosed containing specific combinations and levels of extender pigments and thickeners. These stable mixtures may be employed, inter alia, as a mixture in a method of making paints using prepaints or as a conventional component in a coating, such as a paint, or other end-use where opacifying pigments are employed.

2 Claims, No Drawings

STABLE MIXTURES CONTAINING EXTENDER PIGMENTS

CROSS REFERENCE TO RELATED PATENT APPLICATIONS

This is a non-provisional application of prior pending U.S. provisional application Ser. No. 60/312,356 filed Aug. 15, 2001.

This invention is related to stable mixtures containing extender pigments and more specifically, to stable mixtures containing select combinations and levels of extender and thickener for use in making paint and other end products.

In co-pending U.S. Patent Applications Ser. Nos. 60/183,655; 60/183,656; and 60/247,639; we describe prepaints and method of making paints from these prepaints. One of the prepaints that is required in the invention is a mixture comprising at least one extender pigment. The other two prepaints may contain either opacifying pigment or emulsion polymer binder. A key feature of the method in which the prepaints are employed to make paints requires that the prepaints are compatible with one another so that they may be mixed with each other in various ratios to make at least one paint line. Another key feature is that the prepaint itself, whether comprising extender pigment, opacifying pigment or emulsion polymer binder type, must be stable so that the prepaints themselves may be prepared, shipped and stored without failing, including exhibiting non-homogeneity, syneresis, settling, gelling and viscosity changes.

With respect to the mixtures containing the extender pigment, stability can be a serious problem. This is especially true when one considers that even the best commercially-available extender slurries show some (>2% by volume by visual inspection) syneresis and sedimentation upon storage and must be stirred vigorously and for a considerable length of time before use.

We have discovered a number of stable mixtures containing specific combinations and levels of extender pigments and thickeners that may be employed, inter alia, as mixtures in a method of making paints using prepaints or as a conventional component in a coating or other end-use where extender pigments are employed, including coatings, impregnants, inks, graphic arts, paper, textiles, caulks, mastics, adhesives, sealants, building products and leather.

SUMMARY OF THE INVENTION

We have discovered a first fluid extender pigment mixture containing:
(a) at least one extender pigment; and
(b) at least one thickener;
wherein said extender pigment has an average particle size of less than 3 μm and an average oil adsorption value as measured by ASTM D281-31 of less than 30;
wherein said mixture has a PVC of at least 80, a volume solids of no greater than 50, a specific gravity of less than 3 g/cc and a viscosity at a frequency of 1.25 $sec^{-1}$ of at least 10,000 cps; and
wherein said mixture is stable with no mixing required.

We have discovered a second fluid extender pigment mixture containing:
(a) at least one extender pigment; and
(b) at least one associative thickener;
wherein said extender pigment has an average particle size of 3–5 μm and an average oil adsorption value as measured by ASTM D281-31 of less than 30;
wherein said mixture has a PVC of no greater than 80, a volume solids of no greater than 40, a specific gravity of less than 3 g/cc and a viscosity at a frequency of 1.25 $sec^{-1}$ of at least 5,000 cps; and
wherein said mixture is stable with no mixing required.

We have discovered a third fluid extender pigment mixture containing:
(a) at least one extender pigment; and
(b) at least one thickener;
wherein said extender pigment has an average particle size of less than 5 μm and an average oil adsorption value as measured by ASTM D281-31 of 30–40;
wherein said mixture has a PVC of 80–90, a volume solids of no greater than 50, a specific gravity of less than 3 g/cc and a viscosity at a frequency of 1.25 $sec^{-1}$ of at least 7,000 cps; and
wherein said mixture is stable with no mixing required.

We have discovered a fourth fluid extender pigment mixture containing:
(a) at least one extender pigment; and
(b) at least one thickener;
wherein said extender pigment has an average particle size of less than 7 μm and an average oil adsorption value as measured by ASTM D281-31 of at least 40;
wherein said mixture has a PVC of 80–90, a volume solids of no greater than 50, a specific gravity of less than 3 g/cc and a viscosity at a frequency of 1.25 $sec^{-1}$ of at least 5,000 cps; and
wherein said mixture is stable with no mixing required.

We have discovered a fifth fluid extender pigment mixture containing:
(a) at least one extender pigment; and
(b) at least one thickener;
wherein said extender pigment has an average particle size of 3–5 μm and an average oil adsorption value as measured by ASTM D281-31 of less than 30;
wherein said mixture has a PVC of at least 90, a volume solids of no greater than 50, a specific gravity of less than 3 g/cc and a viscosity at a frequency of 1.25 $sec^{-1}$ of at least 7,000 cps; and
wherein said mixture is stable with occasional mixing required.

We have discovered a sixth fluid extender pigment mixture containing:
(a) at least one extender pigment; and
(b) at least one associative thickener;
wherein said extender pigment has an average particle size of 5–7 μm and an average oil adsorption value as measured by ASTM D281-31 of less than 30;
wherein said mixture has a PVC of no greater than 80, a volume solids of no greater than 50, a specific gravity of less than 3 g/cc and a viscosity at a frequency of 1.25 $sec^{-1}$ of at least 5,000 cps; and
wherein said mixture is stable with occasional mixing required.

We have discovered a seventh fluid extender pigment mixture containing:
(a) at least one extender pigment; and
(b) at least one thickener;
wherein said extender pigment has an average particle size of 5–7 μm and an average oil adsorption value as measured by ASTM D281-31 of 30–40;
wherein said mixture has a PVC of 80–90, a volume solids of no greater than 50, a specific gravity of less than 3 g/cc and a viscosity at a frequency of 1.25 $sec^{-1}$ of at least 7,000 cps; and
wherein said mixture is stable with occasional mixing required.

We have discovered an eighth fluid extender pigment mixture containing:

(a) at least one extender pigment; and
(b) at least one thickener;
wherein said extender pigment has an average particle size of 7–10 μm and an average oil adsorption value as measured by ASTM D281-31 of at least 40;
wherein said mixture has a PVC of 80–90, a volume solids of no greater than 50, a specific gravity of less than 3 g/cc and a viscosity at a frequency of 1.25 sec$^{-1}$ of at least 4,000 cps; and
wherein said mixture is stable with occasional mixing required.

We have discovered a ninth fluid extender pigment mixture containing:
(a) at least one extender pigment; and
(b) at least one thickener;
wherein said extender pigment has an average particle size of 5–10 μm and an average oil adsorption value as measured by ASTM D281-31 of less than 30;
wherein said mixture has a PVC of at least 80, a volume solids of no greater than 50, a specific gravity of less than 3 g/cc and a viscosity at a frequency of 1.25 sec$^{-1}$ of at least 4,000 cps; and
wherein said mixture is stable with constant mixing required.

We have discovered a tenth fluid extender pigment mixture containing:
(a) at least one extender pigment; and
(b) at least one thickener;
wherein said extender pigment has an average particle size of 7–12 μm and an average oil adsorption value as measured by ASTM D281-31 of less than 30;
wherein said mixture has a PVC of no greater than 80, a volume solids of no greater than 50, a specific gravity of less than 3 g/cc and a viscosity at a frequency of 1.25 sec$^{-1}$ of at least 5,000 cps; and
wherein said mixture is stable with constant mixing required.

We have discovered an eleventh fluid extender pigment mixture containing:
(a) at least one extender pigment; and
(b) at least one thickener;
wherein said extender pigment has an average particle size of 7–10 μm and an average oil adsorption value as measured by ASTM D281-31 of 30–40;
wherein said mixture has a PVC of 80–90, a volume solids of no greater than 50, a specific gravity of less than 3 g/cc and a viscosity at a frequency of 1.25 sec$^{-1}$ of at least 7,000 cps; and
wherein said mixture is stable with constant mixing required.

We have discovered a twelfth fluid extender pigment mixture containing:
(a) at least one extender pigment; and
(b) at least one associative thickener;
wherein said extender pigment has an average particle size of 10–12 μm and an average oil adsorption value as measured by ASTM D281-31 of at least 40;
wherein said mixture has a PVC of 80–90, a volume solids of no greater than 50, a specific gravity of less than 3 g/cc and a viscosity at a frequency of 1.25 sec$^{-1}$ of at least 4,000 cps; and
wherein said mixture is stable with constant mixing required.

All of the mixtures contain water and may contain optional additives selected from the group consisting of defoamer, surfactant, coalescent, base, biocide, mildewcide, dispersant, polymeric binder, voided latex polymer and combinations thereof.

As used herein, the term "stable" applies to those mixtures that meet all of the following tests after being stored at a temperature of at least 120° C. for at least ten (10) days:
1. Mixture contains less than 2% by volume of syneresis (determined by inspecting the prepaint visually) (referred to herein as "Stability Test 1").
2. After allowing the mixture to cool to ambient temperature (22–25° C.) but prior to subjecting to mechanical shearing, the mixture has a Brookfield viscosity (measured at a shear rate of 1.25 sec$^1$) of less than 100,000 centipoise, preferably less than 50,000 centipoise (referred to herein as "Stability Test 2").
3. After allowing the mixture to cool to ambient temperature (22–25° C.) and after subjecting to mechanical shearing using a propeller-type mixer, the ratio of the Brookfield viscosity (measured at a shear rate of 1.25 sec$^{-1}$ after heat aging to the Brookfield viscosity (measured at a shear rate of 1.25 sec$^{-1}$) prior to heat aging is no greater than 3 (referred to herein as "Stability Test 3").

Commercial extender pigment slurries do not pass Stability Test 1 and must be stirred, sometimes constantly, prior to use. Mixtures with higher Brookfield viscosity prior to shearing as set forth in Stability Test 2 tend to be gelled and resistant to flow and therefore are difficult to pump in conventional equipment. Stability Test 3 is an indication as to whether or not the mixture developed or will develop a gel network resistant to shear thinning (mixing) during storage.

There are three sets of mixing conditions to which we have applied our definition of stability, namely, those mixtures that:
(1) require no mixing or other forms of agitation over typical storage times (at least 30 days) and conditions (temperatures as high as 140° F. and as low as 25° F.) to remain stable (referred to herein as "stable with no mixing required")(require mixing over 0% of storage time);
(2) require periodic or occasional mixing or other forms of agitation to re-homogenize/break any minimal or slight structure formed over typical storage times (at least 30 days) and conditions (temperatures as high as 140° F. and as low as 25° F.) to remain stable (referred to herein as "stable with occasional mixing required")(require mixing over >0% of storage time); and
(3) require constant mixing or other forms of agitation to re-homogenize/break any significant structure formed over typical storage times (at least 30 days) and conditions (temperatures as high as 140° F. and as low as 25° F.) to remain stable (referred to herein as "stable with constant mixing required")(require mixing over >50% of storage time).

It should be noted that while the "stable with no mixing required" condition requires no mixing or other form of agitation to remain stable, applying some form of mixing or agitation to the mixture (whether occasional or constant) does not exclude that particular mixture from the definition of a stable mixture with "no mixing required". Likewise, it should be noted that while the "stable with occasional mixing required" condition requires only occasional mixing or other form of agitation to remain stable, applying constant mixing or agitation to the mixture does not exclude that particular mixture from the definition of a stable mixture with "occasional mixing required".

The type of mixing or agitation applied to the mixtures is non-limiting and may be via an impellar, recirculation, shaking, milling, rotation, bubbling, sonicating, pumping or any other means to move the mixture about itself.

The mixtures of this invention may be employed as prepaints in systems using delayed product differentiation as described in U.S. patent applications Ser. Nos. 60/183,655; 60/183,656; 60/247,639, as well as employed as a replacement for conventional mixtures of extender pigment, such as extender pigment slurries, mill bases, colorant dispersions, coating colors and the like.

The pigment volume concentration (referred to herein as "PVC") is a measure of how "binder-rich" a formulation is. It is calculated herein by the following formula:

$$PVC\ (\%) = \frac{(\text{volume of pigment(s)} + \text{volume extender(s)})}{(\text{volume of pigment(s)} + \text{volume extender(s)} + \text{volume binder(s)})} \times 100$$

The volume solids content ("VS" herein) is the dry volume of pigment(s) plus the dry volume of extender(s) plus the dry volume of binder(s). It is calculated herein by the following formula:

$$VS\ (\%) = \frac{\text{dry volume of pigment(s)} + \text{dry volume extender(s)} + \text{dry volume binder(s)}}{\text{total volume of formulation}} \times 100.$$

If additives are present, their volume is not included in determining the total dry volume.

Extender Pigment Component

Extender pigments useful herein include exterior and interior extender pigments optimized for the intended end use. Exterior extender pigments are not soluble in water and have a low oil absorption number, as measured by ASTM D 281-31. They are optimized for exterior durability in the particular market where the paint will be sold, and do not detract from the desired non-cracking, non-chalking, and non-dirt-retaining properties of the dried paint. They also provide low cost volume. Interior extender pigments are optimized for hiding, gloss, and low cost.

Suitable extender pigments include barium sulfate (1–15 microns), Blanc Fixe (0.5–5 microns), calcium carbonate (0.05–35 microns), silica (0.001–14 microns), magnesium silicate (0.5–15 microns), aluminum silicate (0.2–5 microns), mica, bentonite, magnesium alumino-silicate, fumed allumina, colloidal attapulgite, synthetic amorphous sodium alumino-silicate, and sodium potassium alumino-silicate, and the like.

Thickener Component

Suitable thickeners for use in the mixtures of the invention include both non-associative, water-soluble/water-swellable thickeners and associative thickeners. Suitable non-associative, water-soluble/water-swellable thickeners include polyvinyl alcohol (PVA); alkali soluble or alkali swellable emulsions, known in the art as ASE emulsions; cellulosic thickeners such as hydroxyalkyl celluloses including hydroxymethyl cellulose (HMC), hydroxyethyl cellulose (HEC) and 2-hydroxypropyl cellulose, sodium carboxymethyl cellulose (SCMC), sodium carboxymethyl, 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose; and the like. Suitable associative thickeners include hydrophobically-modified alkali soluble emulsions, known in the art as HASE emulsions; hydrophobically modified ethylene oxide-urethane polymers known in the art as HEUR thickeners; hydrophobically-modified cellulosics, such as hydrophobically-modified hydroxy ethyl cellulose (HMHEC); hydrophobically-modified polyacrylamides; and the like. Also useful as thickeners are fumed silica, attapulgite clay and other types of clay, titanate chelating agents, and the like.

Optional Components

The mixtures of the invention may further include certain optional components, including defoamer, surfactant, coalescent, biocide, mildewcide, co-dispersant, dispersing resins, latex adsorbing resins, polymeric binder and voided latex polymer (described above).

Suitable defoamers include silicone-based and mineral oil-based defoamers, and the like.

Suitable surfactants include cationic, anionic and non-ionic surfactants.

Suitable coalescents, plasticizers, and other optional solvents include ethylene glycol, propylene glycol, hexylene glycol, 2,2,4-trimethyl-1,3-pentanediol monoisobutyrate (TEXANOL™), glycol ethers, mineral spirits, methyl carbitol, butyl carbitol, phthalates, adipates, and the like.

Suitable mildewcides and biocides include zinc oxide, isothiazolones, triazoles, and the like.

Suitable dispersants for use in the mixtures of the invention include non-ionic, anionic and cationic dispersants such as 2-amino 2-methyl 1-propanol (AMP), dimethyl amino ethanol (DMAE), potassium tripolyphosphate (KTPP), trisodium polyphosphate (TSPP), citric acid and other carboxylic acids, and the like.

Latex polymer binders are polymers or prepolymers which form the primary film of the paint. Binders bind the pigment and/or extenders, provide the required paint flow, and determine the gloss and hardness of the final paint film. The binders selected for the prepaints will depend upon the final use of the formulated paints. Binders suitable for exterior paints are generally suitable for interior paints, but binders suitable for interior paints may not be suitable for exterior paints.

Suitable latex polymer binders include, but are not limited to, homopolymers, copolymers or terpolymers having compositions such as, for example, acrylic and/or methacrylic, polyvinyl acetate, styrene-acrylic, styrene-butadiene, vinyl acetate-acrylic, ethylene-vinyl acetate, vinyl acetate-vinyl versatate, vinyl acetate-vinyl maleate, vinyl acetate-vinyl chloride-acrylic, ethylene-vinyl acetate-acrylic, and urethane polymers, optionally containing up to 10% by weight of functional (for example, but not limited to, carboxylic acid, phosphate, sulfate, sulfonate, amide and combinations thereof) and other monomers, and mixtures thereof.

All ranges disclosed herein are inclusive and the minimums and maximums of the nested ranges are combinable.

Test Procedures

The Brookfield viscosity of the binder prepaints and final paints is measured using spindle #4 of a Brookfield viscometer at 6 rpm (measured at a shear rate of 1.25 sec$^{-1}$).

The mixture are prepared using a laboratory mixer having a 45° pitch stirring blade. The water, dispersant, defoamer, surfactant and biocide are combined and mixed. The extender pigment slurry is slowly added and the mixture is stirred for 15–20 minutes. The binder, coalescent, rheology modifier, ammonia, and additional water, if necessary, are then added.

What is claimed is:

1. A fluid extender pigment mixture, comprising:
  (a) at least one extender pigment;
  (b) at least one thickener; and
  (c) optionally at least one binder
    wherein said extender pigment has an average particle size of less than 3 μm and an average oil adsorption value as measured by ASTM D281-31 of less than 30;

wherein said mixture has a pigment volume concentration of at least 80, a volume solids of no greater than 50, a specific gravity of less than 3 g/cc and a viscosity at a frequency of 1.25 sec$^{-1}$ of at least 10,000 cps.

2. A fluid extender pigment mixture, comprising:
(a) at least one extender pigment; and
(b) at least one thickener; and
(c) optionaily at least one binder wherein said extender pigment has an average particle size of 3–5 μm and an average oil adsorption value as measured by ASTM D281-31 of less than 30;

wherein said mixture has a pigment volume concentration of at least 90, a volume solids of no greater than 50, a specific gravity of less than 3 g/cc and a viscosity at a frequency of 1.25 sec$^{-1}$ of at least 7,000 cps.

* * * * *